US005752710A

United States Patent [19]
Roberts

[11] Patent Number: 5,752,710
[45] Date of Patent: May 19, 1998

[54] PARALLEL-ALIGNED ALL-WHEEL STEERED VEHICLE III

[76] Inventor: Brock F. Roberts, P.O Box 7785, Albuquerque, N. Mex. 87194

[21] Appl. No.: 675,930

[22] Filed: Jul. 5, 1996

[51] Int. Cl.$^6$ ........................................... B62D 3/02
[52] U.S. Cl. .................. 280/91.1; 180/408; 180/234; 180/907
[58] Field of Search ............... 280/91.1; 180/907, 180/408, 233, 234, 199

[56] References Cited

U.S. PATENT DOCUMENTS

| 3,972,379 | 8/1976 | Norris | 180/234 |
| 4,335,626 | 6/1982 | Fisher | 280/91.1 |
| 4,664,213 | 5/1987 | Lin | 180/212 |
| 4,950,126 | 8/1990 | Fabiano et al. | 280/91.1 |
| 5,139,279 | 8/1992 | Roberts | 280/91 |
| 5,174,593 | 12/1992 | Chapman | 180/234 |

FOREIGN PATENT DOCUMENTS

| 62-110527 | 5/1987 | Japan | 180/234 |
| 1-282029 | 11/1989 | Japan | 180/234 |

*Primary Examiner*—Paul N. Dickson

[57] ABSTRACT

An all-wheel steered vehicle in which all wheels are always parallel and have an equal role in steering the vehicle. It consists of a plurality of wheel assemblies capable of wheel rotation about the wheel's (10) axis. The shaft (14) of each wheel assembly passes through bearings (16) such that the shaft is fastened to the chassis (15) but rotatable in its vertical axis. Each shaft (14) is connected to a rotary shaft linkage (17) which when connected to the steering transmission linkage (18) each wheel assembly is maintained in parallel, but allowed to rotate simultaneously about their vertical axis. The vehicle body or seat (21) is attached to the central shaft (20) and is rotatable about the center of the chassis. The vehicle body or seat is in linkage with the wheel assemblies synchronous drive member such that a rotation of vehicle body or seat relative to the chassis causes a simultaneous and equal rotation of all the wheel assemblies about their vertical axis. That is, both the vehicle body or seat and all of the wheels are maintained parallel to one another. The steering mechanism is such that initiating a turn with the steering control on the vehicle body or seat, rotates the vehicle body or seat with respect to the chassis and simultaneously rotates all the wheels on their vertical axes, changing the direction of the vehicle. All wheels have an equal role in steering the vehicle.

2 Claims, 5 Drawing Sheets

5,752,710

PARALLEL-ALIGNED ALL-WHEEL STEERED VEHICLE III

BACKGROUND—FIELD OF THE INVENTION

This invention relates to all wheel steered vehicles

BACKGROUND—DESCRIPTION OF PRIOR ART

Almost all wheeled vehicle designs descend from a common predecessor, that is a rectangular chassis with four wheels that are essentially in line with the opposing sides of the rectangle. Although there have been many variations on this design to improve steering, all are lacking in at least some of the following ways:

(a) All wheels do not play an equal role in steering the vehicle. When a vehicle turns, the force required to change the vehicle's direction is essentially distributed on the steering wheels. It would be a benefit if all the wheels of the vehicle played an equal part in steering. The force would then be shared by all the wheels, maximizing traction.

(b) Each wheel rotates at different rates unless the vehicle is moving in a straight line. When most vehicles negotiate a turn, the wheels on the inside of the turn rotate at a slower rate the outside wheels. If all wheels rotated the same rate at all times, drive and braking designs could be simplified and the stability of the vehicle in turns could be increased.

(c) Existing vehicle designs require a cumbersome turning radius. It would be beneficial in many applications to be able to turn the vehicle within its own footprint.

(d) When a vehicle negotiates a turn, the entire mass of the vehicle must rotate about the vehicle's vertical axis. The force that rotates it, required by the vehicles moment of inertia, is transferred from the tires traction. If only the essential components of the vehicle rotated through a turn, its effective moment of inertia would decrease, improving cornering.

(e) Most steering systems require the operator to steer the vehicle in the initial part of a turn, then return the steering system to its forward position when the turn is complete. In many applications it would be a benefit if the steering system did not need to be returned after the turn has been negotiated.

OBJECTS AND ADVANTAGES

Accordingly several objects and advantages of this invention are:

(a) To provide a vehicle in which all wheels play an equal role in steering by creating a system where all the wheels of the vehicle steer, and all are always parallel to one another. The entire weight of the vehicle rests on primary steering wheels. Depending on the weight distribution of the vehicle, each wheel equally applies traction to change the direction of the vehicle. This design increases traction, stability, responsiveness, and improves safety and performance.

(b) To provide a vehicle in which all wheels rotate at the same rate independent of the path negotiated. This not only simplifies the drive and braking systems, but also increases the vehicle's stability in turns, especially during acceleration or braking, improving safety and performance.

(c) To provide a vehicle which has the ability to turn within its own footprint. This improves maneuverability substantially is beneficial in many situations and applications.

(d) To provide a vehicle in which only the essential components rotate when it rounds a turn. By creating a vehicle whose chassis is directionally constant throughout a turn, the vehicle's effective moment of inertia is decreased. This decreases the amount of force required to change the vehicles direction, allowing more of the frictional force between the wheels an ground to be used in increasing the vehicle's cornering ability.

(e) To provide a steering system where the operator steers during the turn, but does not return the steering at the completion of the turn.

Further objects and advantages of the invention will become apparent from a consideration of the drawings and ensuing description.

DRAWING FIGURES

The drawings include four closely related figures with different components in the steering mechanism. The fifth drawing is for a general operational description.

Figure 1:
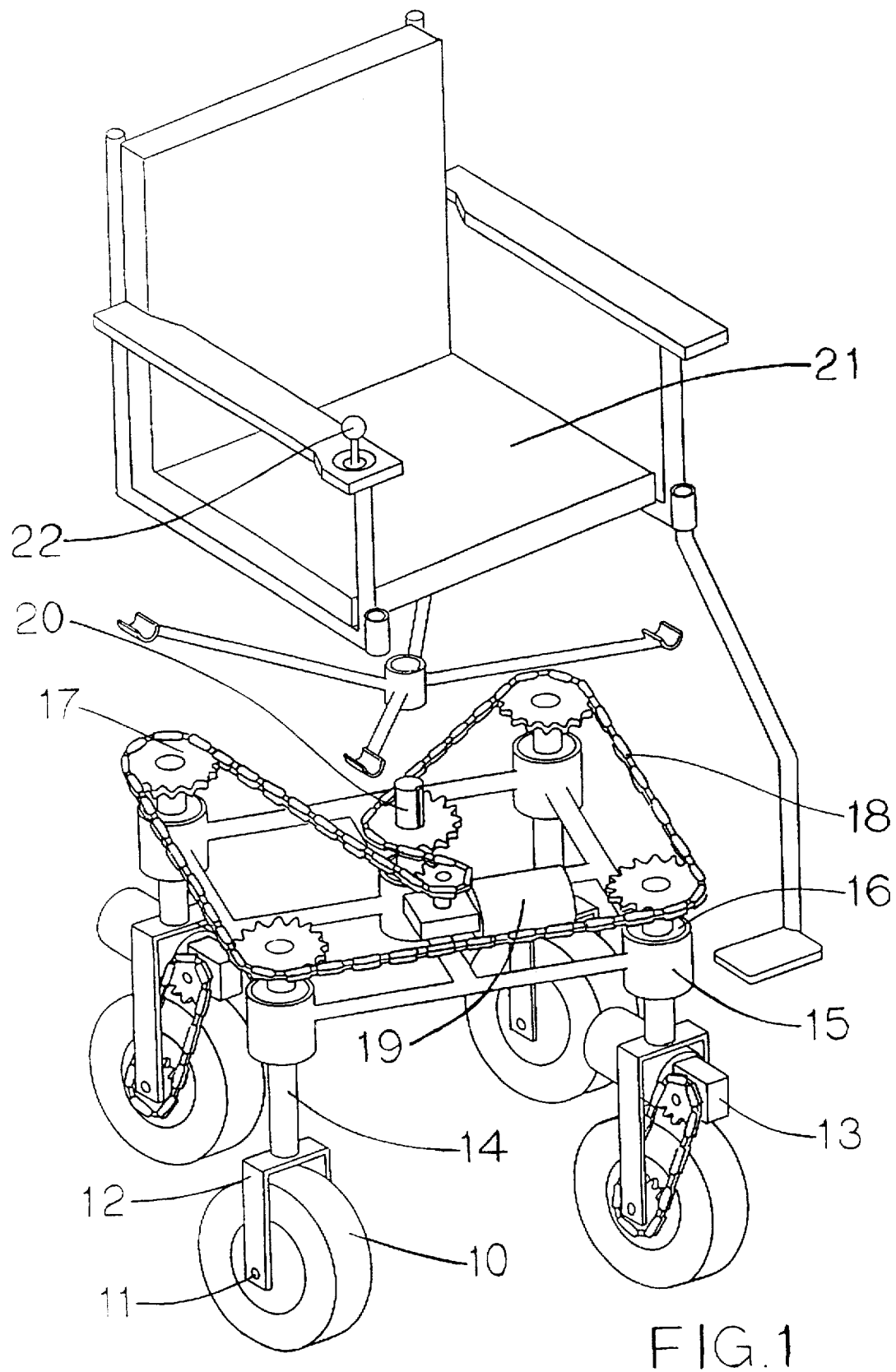
FIG. 1 is a perspective, exploded view of the invention where the steering transmission linkage is a chain and the rotary shaft linkage is a sprocket.

| Reference Numerals in Drawings: | |
|---|---|
| 10 WHEEL | 17 ROTARY SHAFT LINKAGE |
| 11 AXLE | 18 STEERING TRANSMISION LINKAGE |
| 12 SUPPORT BAR OR FORK | 19 STEERING MOTOR |
| 13 DRIVE MOTOR | 20 CENTRAL SHAFT |
| 14 SHAFT | 21 VEHICLE BODY OR SEAT |
| 15 CHASSIS | 22 STEERING AND DRIVE CONTROLS |
| 16 BEARINGS | 23 TENSION PULLEY |

DETAILED DESCRIPTION OF THE EMBODIMENT ILLUSTRATED

FIG. 1 shows a perspective, exploded view of a typical embodiment of the present invention. Each wheel (10) is supported by its axle (11) to a vertically rotatable shaft (14) by a support bar or fork (12). The drive wheels are engaged to drive motors (13) which are attached to their support bar or fork. The wheel (10), axle (11), support bar or fork (12) and shaft (14) are together referred to as a wheel assembly. The shaft (14) of each wheel assembly passes through the bearings (16) such that the shaft is fastened to the chassis (15) but rotatable in its vertical axis. The central shaft (20) passes through bearings and is similarly attached to the chassis, rotatable in its vertical axis. Attached to each wheel assembly shaft and the central shaft is a rotary shaft linkage (17).

Figure 2:
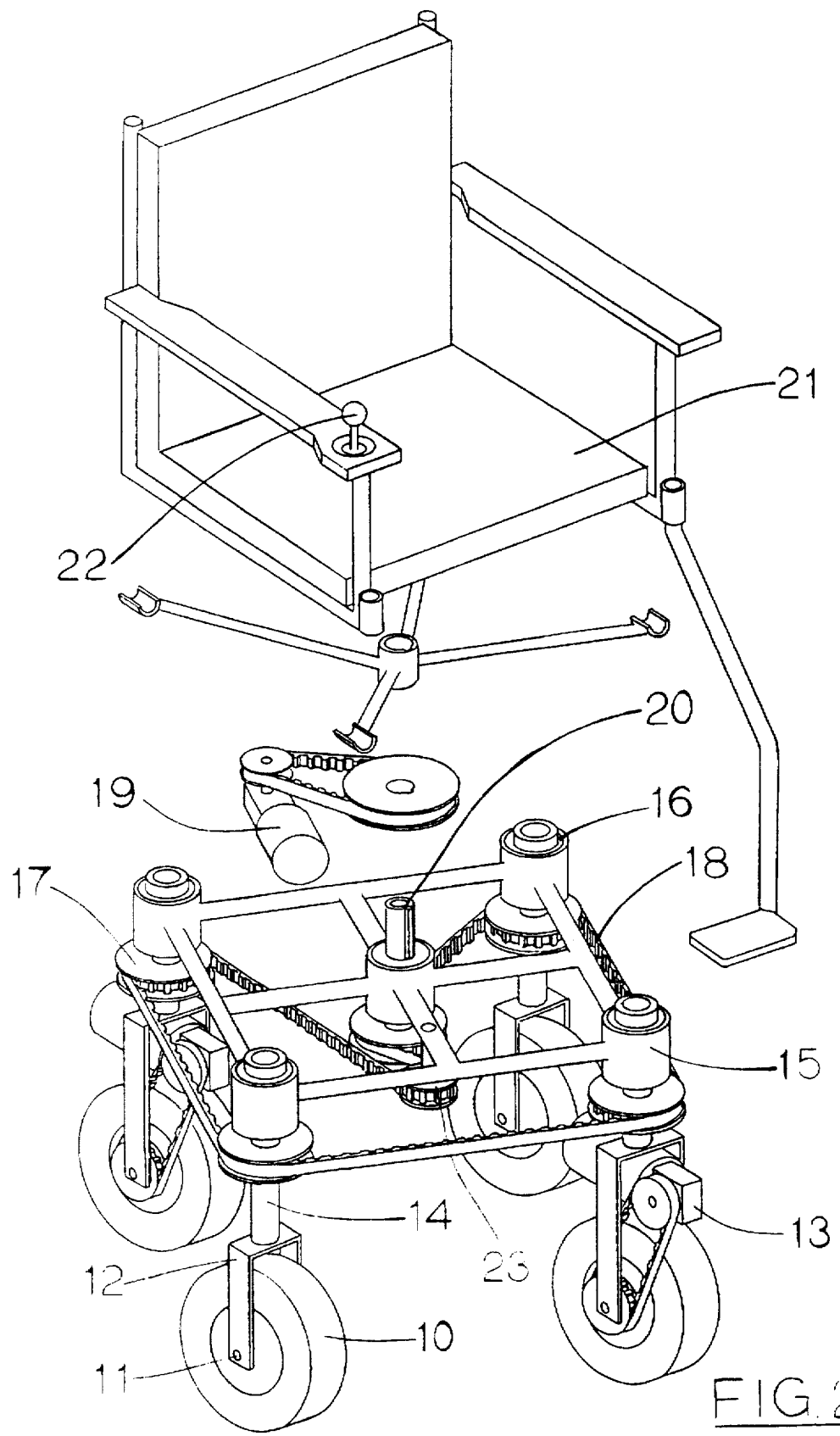
FIG. 2 shows the invention where the steering transmission linkage is a timing belt, and the rotary shaft linkage is a timing pulley.
Figure 3:
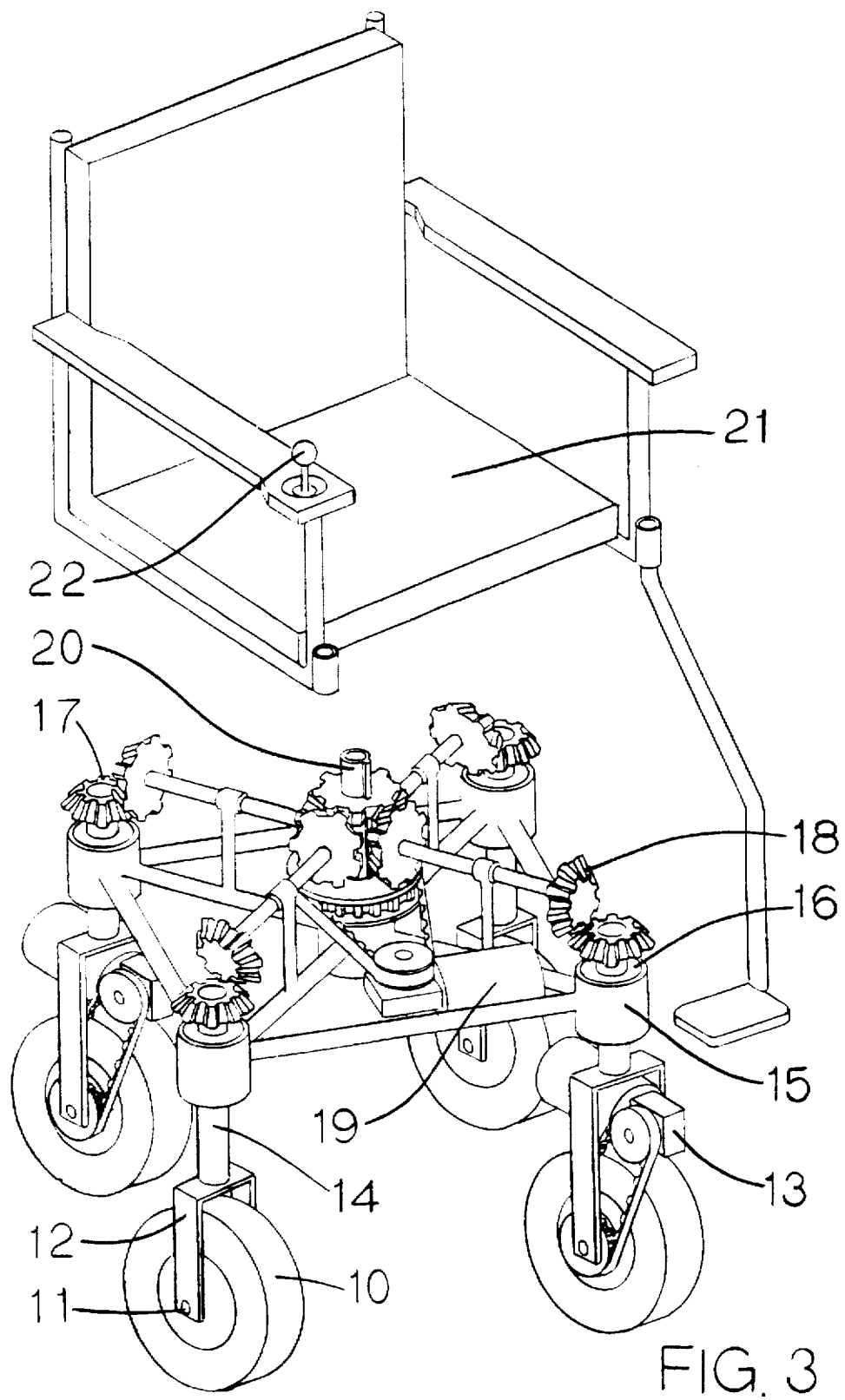
FIG. 3 shows the invention where the steering transmission linkage is a bevel gear and shaft arrangement and the rotary shaft linkage is a bevel gear.
Figure 4:
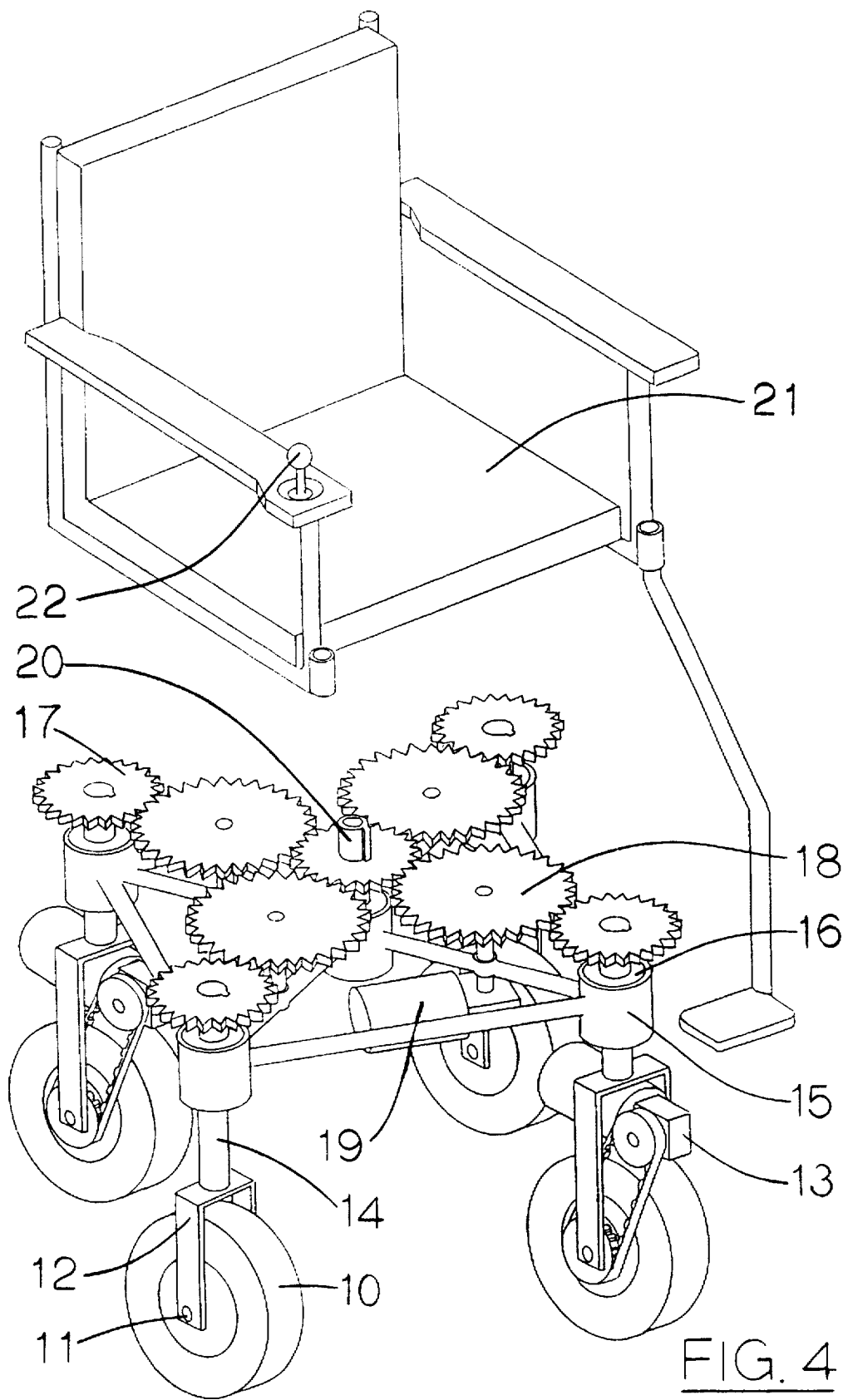
FIG. 4 shows the invention where the steering transmission linkage is a spur gear arrangement and the rotary shaft linkage is a spur gear.

With each wheel parallel to one another, the rotary shaft linkages are all connected together by the steering transmission linkage (18). FIG. 1 is a version of the invention where the rotary shaft linkage is a sprocket and the steering transmission linkage is a chain. The rotary shaft linkage and steering transmission linkage are connected together to maintain the wheel assemblies in parallel, but allow simultaneous rotation of the wheel assemblies and the central shaft. FIGS. 2 through 4 show variations of the invention where the rotary shaft linkage and the steering transmission linkage consist of different components. FIG. 2 is a version of the invention with a timing pulley and timing belt. FIG. 3 is a bevel gear and shaft arrangement. FIG. 4 is mating spur gears. Although the components of these four versions are different, the operation, concept, and performance are the same.

The steering motor (19) is attached to the chassis and engaged with the steering system. Thus the action of the steering motor causes each wheel assembly and the central shaft to rotate in unison, in the same direction and at equal angles. The wheels are always parallel to one another.

The vehicle body or seat (21) is attached to the central shaft so that it aligned parallel to the wheels, and rotates with the central shaft. The steering and drive controls (22) on the vehicle body or seat direct the action of the steering and drive motors through rotatable connections through the central and wheel assembly shafts. Thus when the operator commands a turn, the steering motor's action rotates the vehicle body or seat, and each wheel assembly in unison, in the same direction and at equal angles, always maintaining them in parallel. Activating the drive motors moves the vehicle forwards and backwards in a straight line, or, if activated in conjunction with the steering motor, in a curve.

SUMMARY, RAMIFICATIONS AND SCOPE

Figure 5:
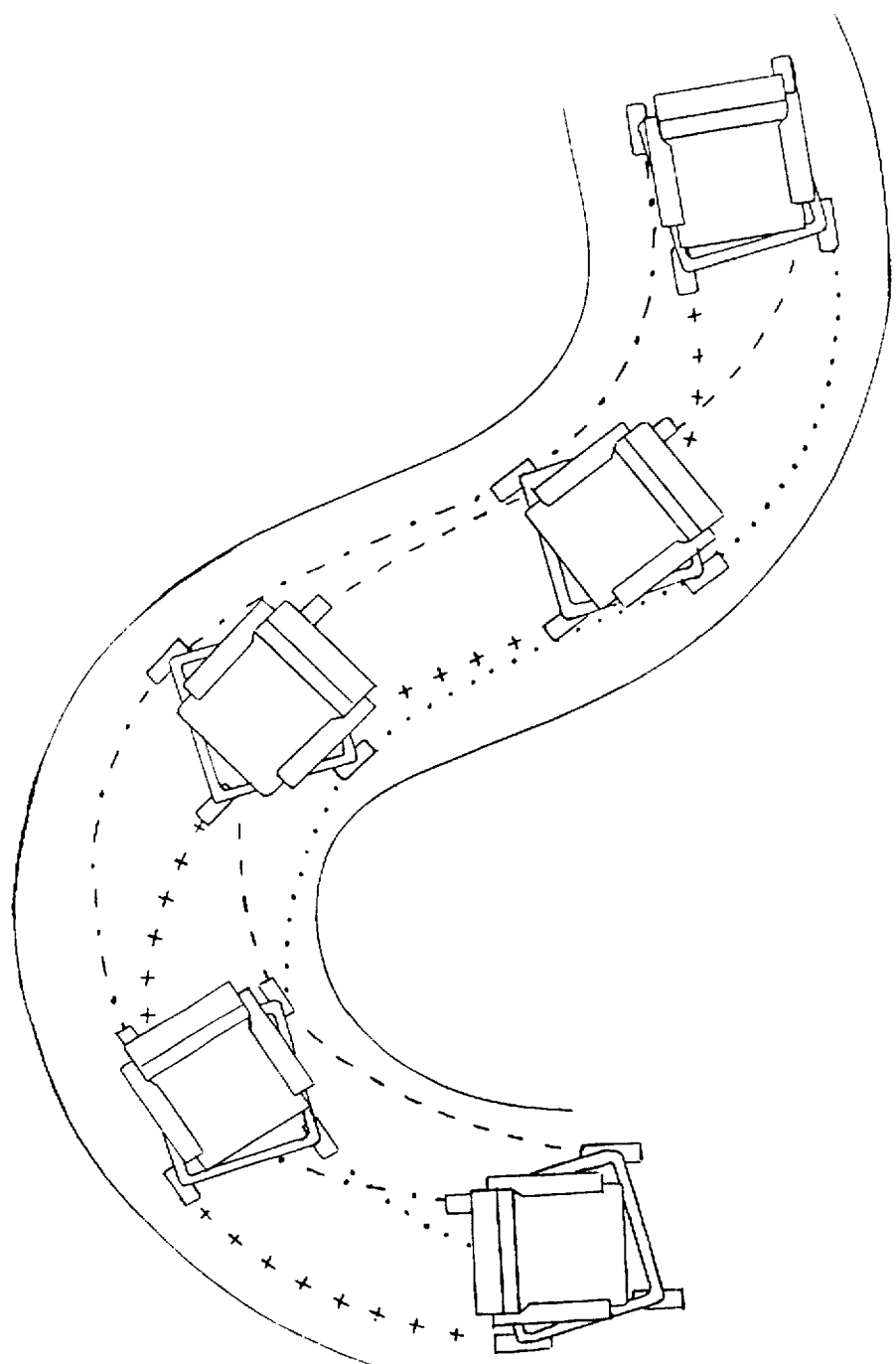
FIG. 5 illustrates how the vehicle's wheels track around a curve.

In the vehicle described above, the body and wheels always point in the direction of motion. This direction of motion is changed by steering the vehicle which simultaneously changes the direction of all the wheels and the body. Thus, all wheels equally share the role of steering the vehicle in that they always directionally equal and that they apply traction to steer the vehicle. Because the chassis remains directionally constant and the wheels remain parallel to one another, turning appropriately to change the direction of the vehicle, the wheels each roll out equal arcs, traveling at the same rate. FIG. 5 is an above view of the vehicle in five positions as it negotiates a curve. Each dotted line represents the path of each wheel. Each wheels path is the same length because each wheel rotates at the same rate.

The described vehicle has the ability to turn within its own footprint, that is if the operator turns the steering wheel, she can rotate to face any direction.

Because the body or seat is always parallel to the wheels, and steering the vehicle simultaneously changes the direction of the body or seat with the wheels, directional response is virtually immediate. The vehicle is highly responsive to the operator.

Because the chassis is directionally constant, the effective moment of inertia of the vehicle is decreased, decreasing the amount of force required to change the vehicle's direction, improving cornering.

As the vehicle goes through a turn the operator simultaneously changes the direction of the body or seat, and the wheels. At the completion of the turn the operator does not need to return the steering system to the straight ahead position. Because the wheels are parallel to one another, the vehicle is essentially always in position to move straight, even at the completion of a turn.

While my above description contains many specificities, these should not be construed as limitations on the scope of the invention, but rather as an exemplification of embodiments thereof.

For example, the wheel assemblies should be equipped with drive, breaking and suspension appropriate for the application of the vehicle. The drive system could consist of one or more wheel motors, or a central engine with appropriate linkage to the wheels. In the case of an electric vehicle, the batteries could be attached to either the chassis or the body with appropriate rotatable connections from the controls to the chassis, and for power to the wheel motors. Hydraulic drive would be similar with rotatable connections to wheel motors. The body could be enclosed or open. The size of the vehicle could be small or large. The synchronous drive could be timing belt, chain, gears or similar. The wheel assemblies could be adapted to have caster or camber if needed. Applications of this vehicle could vary for wheel chairs, automobile, fork lifts etc.

Accordingly, the scope of the invention should be determined not by the embodiment illustrated, but by the appended claims and legal equivalents.

I claim:

1. An all wheel steered vehicle, comprising:

a) a chassis having a plurality of bearings mounted therein;

b) a central shaft mounted for rotation in one of said bearings and having a rotary shaft linkage attached thereto, said rotary shaft linkage being symmetrical about said shaft;

c) a plurality of wheel assemblies, each wheel assembly having a wheel shaft mounted for rotation in one of said bearings, an axle attached to the wheel shaft, a wheel mounted for rotation on the axle, and a rotary shaft linkage attached to said wheel shaft, said rotary shaft linkage being symmetrical about said wheel shaft;

d) a vehicle body attached to the central shaft for rotation therewith;

e) a synchronous drive member directly engaging all of said rotary shaft linkages to define a synchronous drive, the synchronous drive member being disposed such that all of said shafts rotate equally with respect to each other; and f) steering means for engaging the synchronous drive, causing all the shafts and the vehicle body to rotate simultaneously and equally with respect to the chassis.

2. The all wheel steered vehicle in claim 1 wherein:

a) the wheel shafts of each wheel assembly are vertical;

b) the axles of each wheel assembly are horizontal; and c) the vehicle body is perpendicular to each of the axles.

* * * * *